Dec. 15, 1936.  E. J. WILLIS  2,064,236
NAVIGATING INSTRUMENT
Filed May 21, 1935   3 Sheets-Sheet 1
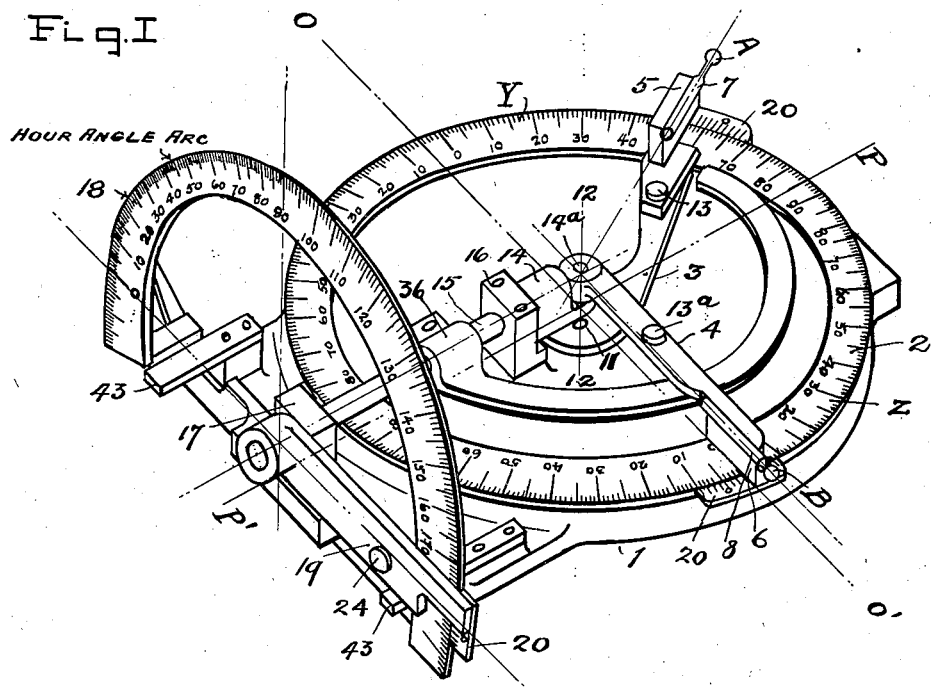
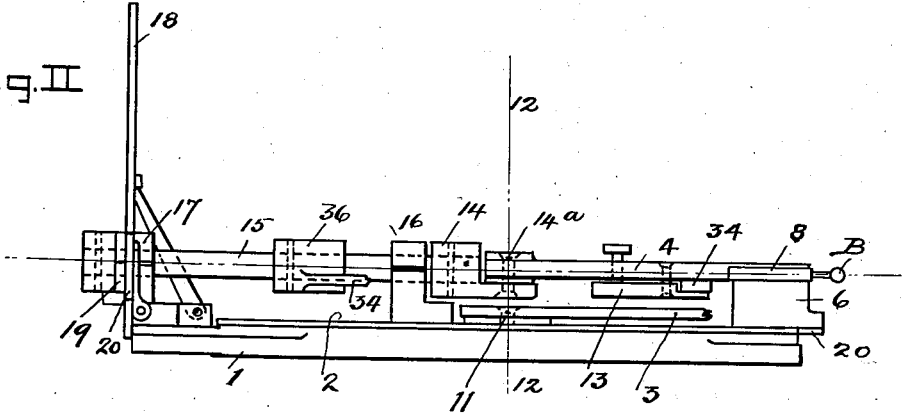
EDWARD J. WILLIS.
INVENTOR
BY Arthur Scrivenor
ATTORNEY Dec. 15, 1936.   E. J. WILLIS   2,064,236
NAVIGATING INSTRUMENT
Filed May 21, 1935   3 Sheets-Sheet 2
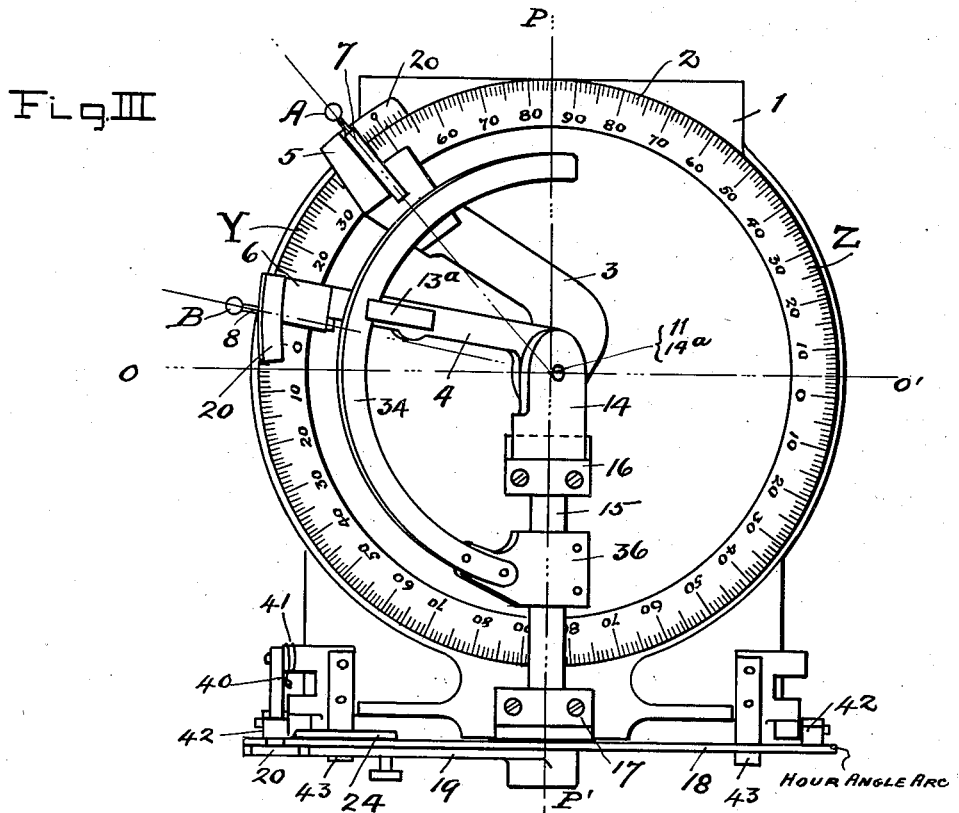
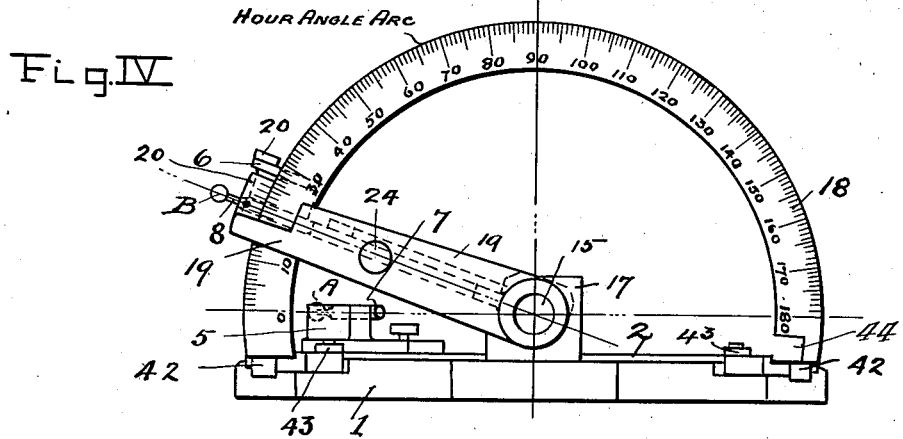
EDWARD J. WILLIS
INVENTOR
BY Arthur Scrivenor
ATTORNEY Dec. 15, 1936.  E. J. WILLIS  2,064,236
NAVIGATING INSTRUMENT
Filed May 21, 1935  3 Sheets-Sheet 3
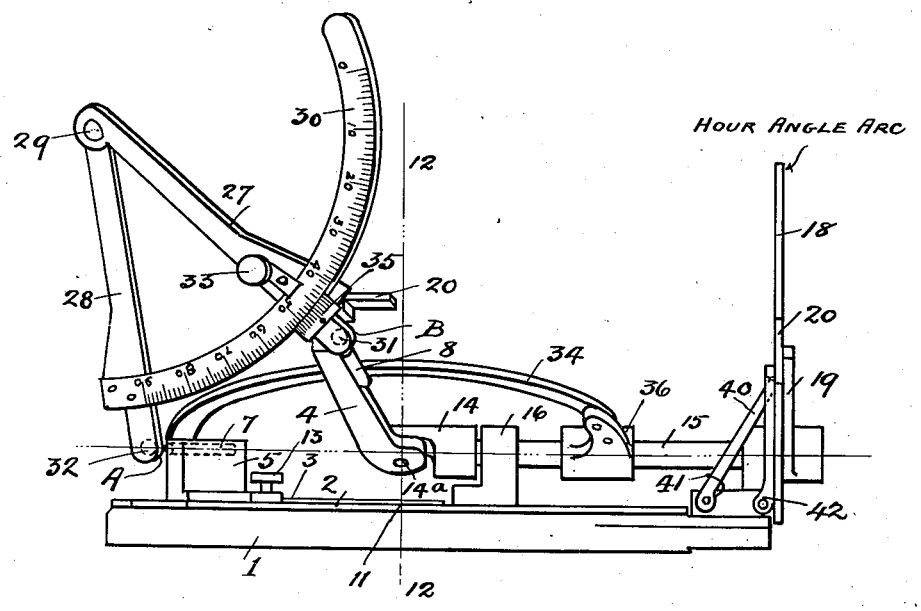
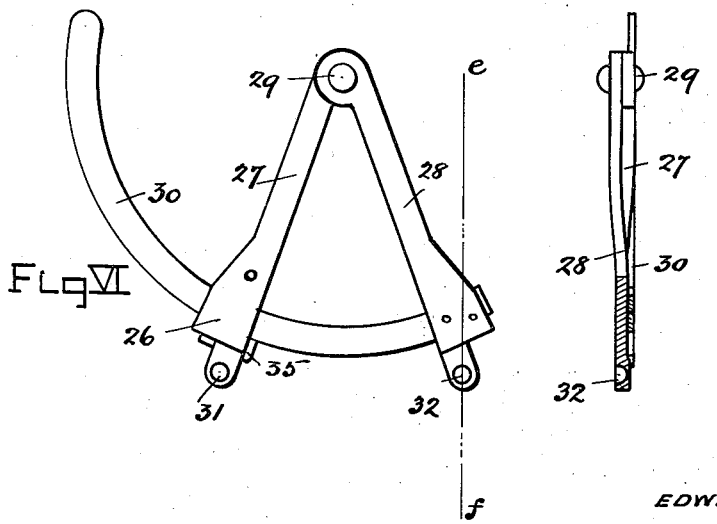
EDWARD J. WILLIS.
INVENTOR
BY *Arthur Scrivenor*
ATTORNEY Patented Dec. 15, 1936

2,064,236

UNITED STATES PATENT OFFICE 2,064,236

NAVIGATING INSTRUMENT

Edward J. Willis, Richmond, Va.

Application May 21, 1935, Serial No. 22,494

6 Claims. (Cl. 33—1)

My invention relates to navigating instruments.

The determination of the line of position, according to the methods generally employed by navigators and aviators, involves the calculation of the altitude and azimuth of a celestial body, or the calculation of the hour-angle and azimuth, from the dead-reckoned position. Altitude and azimuth are obtained from the declination of the celestial body, the dead-reckoned latitude, and the dead-reckoned hour-angle. Hour-angle and azimuth are obtained from the declination of the celestial body, the dead-reckoned latitude, and the observed altitude of the celestial body. In any case, the practice of determining the two desired items involves either the use of higher mathematics and somewhat difficult calculations, or the use of complicated tables.

Many types of instruments have been devised, whereby, of altitude, hour-angle, latitude, declination, and azimuth, if three items be known, the other two may be obtained. Most of these instruments are intended to solve spherical triangles, and are difficult to set up and operate; and many of them are of such a delicate nature and construction that after some use results obtained by them cannot be relied upon. Furthermore, most of these instruments or mechanical devices are bulky and heavy; require setting up; and are not adapted to use in certain modern fields; aviation, for instance.

In my Patent No. 1,845,860 I described a navigating instrument with which, from the knowledge of any three of the factors altitude, hour-angle, latitude, declination, and azimuth, the other two factors are simultaneously obtained by a mechanical operation of the instrument, without the use of tables and calculations.

The object of my present invention is to provide a light and easily portable navigating instrument; one which shall be convenient to use by navigators and aviators; and at the same time one which shall be sufficiently accurate for aviation under all conditions, and for marine navigation except when visibility is very low.

A further object of my invention is to provide a navigating instrument by which an aviator, navigator or other operator, by means of relatively simple and accurate mechanism, may determine any one of the factors latitude, declination, altitude or hour-angle when the other three of said factors are known, or may determine any one of the factors latitude, declination, altitude or azimuth, when the other three of said factors are known.

It is a still further object of my invention to provide a navigating instrument of the type mentioned in the preceding paragraph, which operates on the principle that the chord of the distance between observer and object is the chord of the complement of altitude, and which includes three pivoted arms, the first of which is secured to the outer end of a rotatable shaft with the end of said arm adapted to traverse a semi-circular series of graduations representing degrees of hour-angle or azimuth; the second of which is secured to the inner end of said shaft for rotation by said shaft and for pivotal movement in a plane parallel to the axis of said shaft with the end of said arm adapted to traverse a semi-circular series of graduations representing degrees of declination or altitude; and the third of which is pivotally mounted on an axis perpendicular to the axis of said shaft with the end of said arm adapted to traverse a semi-circular series of graduations representing degrees of latitude, and to associate with said second and third arms a novel means for determining the angle or the complement of the angle included between said arms.

Referring to the drawings, in which the same numerals indicate the same parts in the several views:

Figure I shows the instrument in perspective.

Figure II is a part side elevation, to show the relation of certain axes.

Figure III shows the instrument in plan; and Figure IV in front elevation.

Figure V shows the complete instrument in side elevation.

Figure VI shows a part of the instrument in front elevation; and Figure VII a side view of the same, partly in section.

In Figure I the numeral 1 indicates a base casting, preferably of a light but stiff alloy, upon which is mounted or inscribed a circular series of graduations 2, which circular series comprises two semi-circular portions or series of graduations, which I have designated by the letters Y and Z; and which represent the upper and lower meridian, respectively. Each of these two semi-circular series of graduations Y and Z is graduated exactly like the other; the said graduations ranging from zero on the horizontal center line O—O', which represents the equator, to 90 degrees on the center line P—P', which represents the polar center line. For mechanical reasons the graduations are offset from the center line P—P' and from the horizontal center line O—O' by 5 degrees; the reason for which will be explained later. The circular series of graduations 2 is formed from or inscribed upon an integral part; consequently the relation of the two semi-circular series of graduations Y and Z to each other, and the relation of each of them to the common vertical axis 12—12 is more accurate than it could be were the two semi-circular series of graduations Y and Z constructed separately.

Pivoted at the center of the circular series of graduations 2 are two arms, 3 and 4. At the outer ends of these arms are blocks 5 and 6; and mounted on the blocks are the pins 7 and 8, which terminate in the balls A and B, respectively. The arm 3 is pivoted on the base plate 1 at 11, and indicates angular distances on the semi-circular series of graduations Y and Z. The vertical axis 12—12 of the two semi-circular series of graduations Y and Z passes through the pivot 11. As the arm 3 is swung about the axis 12—12, the ball B will describe a circular arc, and this arc is not changed if the pivotal point 11 is raised or lowered on the axis 12—12.

The arm 4 is pivoted on the axis 12—12 to a block 14 which is mounted on a shaft 15, carried in bearings 16 and 17. The shaft mounting is in the plane of the polar center line P—P'; and is perpendicular to the axis 12—12 of the circular series of graduations 2. On each of the arms 3 and 4 is arranged a means for clamping the arm after it has been set in position, this means, on the arm 3, being designated by the reference character 13, and on the arm 4 by the reference character 13ª.

To one side of the circular series of graduations 2 there is mounted, in an upright position, a member provided with a semi-circular series of graduations 18. The center of the semi-circular series of graduations 18 is on the projected axis of the shaft 15. The member carrying the semi-circular series of graduations 18, is graduated to represent degrees of hour-angle or azimuth, and is preferably hinged to the base plate 1 so that it may be moved to assume a position substantially parallel to the upper surface of said base plate when the instrument is not in use.

Note the following relations:—

When the instrument is in use, the member carrying the semi-circular series of graduations 18 is arranged perpendicular to the plane of the member carrying the circular series of graduations 2. The axis of the semi-circular series of graduations 18 is perpendicular to the axis of the circular series of graduations 2; that is, to the axis of the semi-circular series of graduations Y and Z. The balls A and B at the ends of arms 3 and 4 respectively, are, when in the position shown in Figs. I, II, and III of the accompanying drawings, in the same plane as the axis of the semi-circular series of graduations 18. The reasons the plane of circular series of graduations 2 is below the axis of the semi-circular series of graduations 18 are, first, to leave clearance around the balls A and B for the use of special calipers; and to permit the arm 4 and the ball B carried thereby to be moved through substantially 180 degrees when the shaft 15 is rotated, which movement of the arm 4 and ball B is in a vertical plane transverse to the axis of the shaft 15, i. e., to permit the arm 4 and ball B to swing over from one side of the polar center line P—P' to the other side of the said line and above the circular series of graduations 2. This difference between the plane of the circular series of graduations 2 and the axis of the semi-circular series of graduations 18 in no wise affects the mathematics.

Also note that the horizontal length between each of the balls A and B and the center of the circular series of graduations 2 or axis 12—12 is the same.

To the outer end of shaft 15, at the center of the semi-circular series of graduations 18, there is fixed the arm 19; the outer end of which is arranged to indicate the angles graduated on the said semi-circular series of graduations 18. This arm is fixed to the shaft 15 so that when said arm is moved over the semi-circular series of graduations 18, the shaft 15 turns. The arm 4 is pivoted at 14ª to shaft 15, so that when the shaft 15 is turned, the arm 4 turns about the axis of shaft 15. When arm 19 is moved through any angle, arm 4 swings through the same vertical angle. The relative positions of arm 4 and of arm 19 are such that when arm 4 is down on the circular series of graduations 2, as seen in Figure I, the arm 19 indicates 180° on the scale of the semi-circular series of graduations 18. Since both pivots 11 and 14ª lie on axis 12—12, we may say that arms 3 and 4 are pivoted on the same axis which is the vertical as in passing through the center of the circular series of graduations 2 (semi-circular series of graduations Y and Z). We may also say that the arm 4 is pivoted on the inner end of the shaft 15 at the intersection of the axis 12—12 and the axis of the shaft 15 when said arm is in the position shown in Figs. I, II, and III.

Each of the arms 3, 4 and 19 is provided with a vernier as at 20; those attached to arms 3 and 4 reading on the semi-circular series of graduations Y and Z respectively; and that attached to arm 19 reading on the semi-circular series of graduations 18. The arm 19 is provided with a clamp, as at 24, to clamp said arm in position after setting.

In Figure V, VI and VII is shown a pair of calipers 26. The angle of opening between the legs 27 and 28, which are pivoted at 29, is indicated on the graduated quadrant 30, which is fixed to leg 28. The scale is reversed, to read from zero, up to 90 degrees, i. e., the graduation "0" is applied on the quadrant 30 at the outer, free end of said quadrant, and the graduation "90" is applied on the quadrant 30 adjacent the leg 28.

At the extremity of each of the legs 27 and 28 is formed a hemispherical socket, 31 and 32, of a diameter to just fit the balls A and B. Note that the lengths of leg from pivot 29 to the center of each of the sockets 31 and 32 are the same; and that they are the same as the length of arm 3 from the center of ball A to pivot 11; and the length of arm 4 from the center of ball B to the intersecting point of the axis of shaft 15 and axis 12—12 of the circular series of graduations 2. And because these lengths are alike, when the caliper sockets 31 and 32 are applied to balls A and B, the caliper scale on the graduated quadrant 30 will give a true reading of the angle enclosed between the two lines originating at the centers of the balls A and B, and meeting at the pivotal axis 12—12.

When measuring altitude the semi-circular series of graduations Y is used for setting up the D. R. latitude; and the semi-circular series of graduations Z for setting up the declination.

For mechanical reasons declination is set on the semi-circular series of graduations Z which represents the lower meridian. The ball A represents the position of the observer. The ball B represents the position of the object. The semi-circular series of graduations 18 represent degrees of hour-angle or azimuth. The operation is as follows: Ball A representing the position of the observer, the arm 3 is set and clamped to indicate the D. R. latitude on the semi-circular series of graduations Y. Ball B representing the object, the arm 4 is set and clamped to indicate the declination of the object on the semi-circular series of graduations Z, which semi-circular series of graduations represents the meridian of the object. The hour-angle being known, the arm 19 is turned about the center of the semi-circular series of graduations 18 and is clamped thereon in a position corresponding to the known hour-angle. The angle indicated is the hour-angle between the represented meridians on which ball A and ball B, respectively, lie. The semi-circular series of graduations 18 is graduated from the left end toward the right end as viewed in Fig. IV of the accompanying drawings, i. e., the graduation or calibration "0" is positioned on said semi-circular series of graduations at the end adjacent the semi-circular series of graduations Y and the graduation or calibration "180" is positioned on said semi-circular series of graduations at the end adjacent the semi-circular series of graduations Z, the semi-circular series of graduations Y representing the meridian of the observer on the instrument when determining altitude. By means of the arm 19, shaft 15, and arm 4, we swing the arm 4 and the ball B carried thereby toward or from the semi-circular portions Y and Z, i. e., we swing the represented meridian of the object toward or away from the represented observer's meridian; a matter of convenience; but giving the same result as if we swung the represented meridian of the observer toward and away from the represented meridian of the object.

The angle "A"—11—"B", or the angle between the lines A—11 and B—11, corresponds to the angle between a line drawn from the observer or the zenith to the earth's center, and a line drawn from the object to the earth's center. It is the zenith distance of the object. If both zenith and object are on one and the same meridian it is a simple matter to determine the altitude by either addition or subtraction. When they are not on the same meridian it is here that more complex calculations are introduced, to allow for the difference in meridian, which is the difference in time.

I measure the angle enclosed between the lines A—11 and B—11, which corresponds to the zenith distance of a given object at a given time; and 90° minus this measured angle gives the altitude of the object. This is the altitude of the object from the dead-reckoned (D. R.) position at the time of the sight. Since the quadrant 30 of the calipers is graduated backwards, i. e., graduated from the free end of the quadrant 30 toward the end fixed to the leg 28, the calipers indicate altitude when set to zenith distance. As far as altitude is concerned, the positions of balls A and B representing the position of the observer and the position of the object, respectively, are reversible. One can set ball A at declination and ball B at latitude and still obtain the same caliper reading.

The next step of the navigator is to compare the altitude so obtained with the altitude taken by the sextant. If the latter is greater than the former, the navigator moves his line of position toward the object by the difference. If the altitude taken by the sextant is less than the altitude given by the instrument, then the navigator moves his line of position away from the object by the difference.

The line of position is always perpendicular to the azimuth of the object. The instrument yields the azimuth of the object from the D. R. position. This azimuth he draws on the chart from the D. R. position; and then he draws his line of position perpendicular thereto. This is the modern practice. To determine the azimuth of the object, leave the arm 3 and ball A set and clamped at latitude on semi-circular series of graduations Y; then set and clamp arm 4 and ball B to altitude on semi-circular series of graduations Z; and then set the calipers to declination. Turn the arm 19 until the balls A and B fit into the sockets 31 and 32 at the outer ends of the arms 27 and 28, respectively, and then read azimuth on the semi-circular series of graduations 18; reading from that pole from which declination takes its name. When determining azimuth as above, ball A represents the pole from which declination takes its name. Ball B is the object; and pole P is the observer.

In using this instrument, if latitude and declination are of the same name, latitude and declination must be set on the same side of the equator, which is represented by the line O—O'; and if they are of opposite name, one must be set on one side of the equator, i. e., on one side of the line O—O' which represents the equator, and one on the other side.

The object of all instruments of this type is to save the navigator or aviator from having to calculate the altitude and azimuth of the object from the D. R. position; and so to obtain his line of position without calculation and without the use of logarithms. Up to the present time such instruments have been very expensive, and of considerable bulk and weight. The instrument described and illustrated herein is small, light, and cheap, in comparison to others. It has been tested by experts in navigation and aviation, and has been found to be remarkably accurate. A particular feature of the instrument described and illustrated herein is the use of the two balls A and B, in connection with the calipers 26. It will be noted that the quadrant 30 of the calipers 26 is graduated to indicate zero when the legs 27 and 28 are 90° apart; and to indicate substantially 90° when the calipers are in closed position; that is, when the two legs 27 and 28 are brought together. The fact that the calipers 26 do not indicate up to exactly 90°, is a matter of no moment to the navigator or aviator, because altitudes above 85° are practically never used in navigation or aviation. The folding of the member carrying the semi-circular series of graduations 18 from its normal position, i. e., from a position perpendicular to the plane of the circular series of graduations 2, to a position substantially parallel to and overlying the same circular series of graduations 2 for convenience in packing, is a very desirable feature; and the use of one complete or integral circular series of graduations 2 comprising the two semi-circular series of graduations Y and Z graduated or calibrated as above described, tends greatly towards accuracy, and also simplifies the machine.

Obviously, it would be extremely difficult to correctly and accurately graduate two separate semi-circular series of graduations, and then to place them in proper relation to each other and still preserve the correct relationship of the graduations of the one to the graduations of the other. Instead of hinging the member carrying the semi-circular series of graduations 18 to the base plate as above described, said member may be removable from said base plate, and I may if desired terminate the ends of the member in shouldered studs or dowels, which fit into holes in the base plate, and which may, if desired, be threaded, and secured by nuts.

The weight of the arm 4, with its block 8, pin 6, and ball B is carried by a substantially semi-circular member 34, one end of which terminates in a sleeve-like portion 36 fixed to the shaft 15 for rotation therewith. After setting the arm 4 to indicate the desired angle on the semi-circular series of graduations Z, the said arm is clamped to the semi-circular member 34 by means of the clamp 13ª. By this construction, the position of the arm 4 with respect to the graduations on the semi-circular series of graduations Z is undisturbed, but the arm 4 and ball B may be swung through 180° in a vertical plane above the circular series of graduations 2 by oscillation of the shaft 15 to which said arm and semi-circular member 34 are attached.

In the preceding description I have explained the procedure for determining altitude from a knowledge of the factors latitude, declination and hour-angle, and for determining azimuth from a knowledge of latitude, altitude and declination. In order to determine latitude from a knowledge of declination, altitude and hour-angle, it is necessary to set the arm 4 and ball B to a position on the semi-circular series of graduations Z corresponding to the known latitude; set the calipers 26 to correspond to the known altitude; set the arm 19 to a position on the semi-circular series of graduations 18 corresponding to the known hour-angle; apply one of the sockets on the caliper leg to the ball B; and turn the arm 3 and ball A carried thereby until the ball A fits into the socket on the other caliper leg. The position of the arm 3 and ball A with respect to the graduations on the semi-circular series of graduations Y will indicate the latitude. Or, if it is desired to determine latitude from a knowledge of declination, altitude and azimuth, the calipers 26 are set to a position corresponding to the known declination; set the arm 4 and ball B to a position on the semi-circular series of graduations Z corresponding to the known altitude; set the arm 19 to a position on the semi-circular series of graduations 18 corresponding to the known azimuth; apply one of the sockets on the caliper leg to the ball B; and turn the arm 3 and ball A carried thereby until the ball A fits into the socket on the other caliper leg. The position of the arm 3 and ball A with respect to the graduations on the semi-circular series of graduations Y will indicate the latitude. To determine declination from a knowledge of latitude, altitude and hour-angle, set the arm 3 and ball A to a position on the semi-circular series of graduations Y corresponding to the known latitude; set the calipers to a position corresponding to the known altitude; set the arm 19 to a position on the semi-circular series of graduations 18 corresponding to the known hour-angle; apply one of the sockets on the caliper leg to the ball A; turn the arm 4 and ball B carried thereby until the ball B fits into the socket on the other caliper leg; clamp arm 4 and ball B in position; release the clamp 24; and move the arm 19 to the right until the arm 4 and ball B overlie the semi-circular series of graduations Z. The position of the arm 4 and ball B with respect to the graduations on the semi-circular series of graduations Z will indicate declination. Or if it is desired to determine declination from a knowledge of latitude, altitude and azimuth, set the arm 3 and ball A to a position on the semi-circular series of graduations Y corresponding to the known latitude; set the arm 4 and ball B to a position on the semi-circular series of graduations Z corresponding to the known altitude; set the arm 19 to a position on the semi-circular series of graduations 18 corresponding to the known azimuth; and adjust the caliper legs so that the balls A and B fit within the sockets 32 and 31 respectively. The position of the caliper leg 27 with respect to the graduations on the quadrant 30, will indicate declination. It should be noted that the instrument cannot indicate an azimuth above 180°, and that where an azimuth is above 180°, the azimuth indicated is 360° minus azimuth. It should be further noted that the azimuth indicated on the instrument is the azimuth measured from that pole from which declination takes its name.

In an instrument of this type the parts must be substantial and also durable, or the instrument will soon become unreliable. For this reason the balls A and B are mounted on stout pins 5 and 6; which are attached to substantial blocks 7 and 8; which in turn are attached to substantial arms 3 and 4, substantially pivoted to their respective bases.

When the arm 3 and ball A is set to a position on the semi-circular series of graduations Y to correspond to latitude, for instance, this is equivalent to setting a line, radiating from the center of the semi-circular series of graduations Y to the center of the ball A, to a given graduation on the said semi-circular series of graduations. This imaginary line has no substance, and it could be laid directly on the graduation. But the structure of the instrument includes substantial parts; and it therefore becomes necessary to lay the imaginary line which lies within these parts upon a graduation on said semi-circular portion Y. Manifestly, the imaginary line must be moved until it is outside the substantial parts, so that the imaginary line may be placed upon the desired graduation. So, leaving the arm 3 and the ball A pointing in the true direction, the imaginary line and the graduations on the circular series of graduations 2 are moved five degrees to one side, where the imaginary line will not be obstructed by the substantial parts. The verniers 29 are also moved five degrees. The result is that when the ball A is directly on the polar center line P—P', the imaginary line from the center of the circular series of graduations 2 to the center of the ball A is indicating exactly 90°; which 90° graduation, for the reasons given above, is set five degrees, or more or less, to one side of the polar center line P—P'. The same explanation applies to the readings with reference to the ball B.

When the instrument is not in use the member on which the semi-circular series of graduations 18 is clamped is folded down; being for that purpose hinged at 42. Since the arm 19 is fixed on the shaft 15 it cannot be folded down with the member on which the graduations 18 are inscribed. Nor could the member be folded down so long as it is held by the arm clamp 24. Provision is made at one end of the member on which the semi-circular series of graduations 18 are inscribed so that the clamp and arm will be released from the said member. When the arm 19 is swung to this point, which is just below the 180° graduation, the clamp 24 is freed from contact with the member, and said member can be folded down over the base plate 1 to assume a position substantially parallel to said base plate. This provision is a simple notch 44 in the body of the members on which the graduations 18 are inscribed through which the grip of the clamp 24 can pass.

At one side of the base plate, a pivoted prop 40 holds the member on which the graduations 18 are inscribed in its upright position; the upper end of this prop engaging beneath a projection on the back of the member on which the graduations 18 are inscribed, and being retained in such engagement by means of a light spring 41. So that the arm 19 may be supported at each end of its swing I provide the two stops 43.

In construing the claims, the following features of my instrument should be noted:

Virtually, the axis of the semi-circular series of graduations 18 and of the shaft 15 lie in the same plane as does the circular series of graduations 2; and is coincident with the polar axis P—P'. Therefore, virtually, the axis of the semi-circular series of graduations 18 passes through the center of the circular series of graduations 2; which center may be considered as representing the earth's center. The hour-angle is the angle at the pole between the meridian of the object and the meridian of the observer; and it may be regarded as the arc on the equinoctial lying between these meridians. Hence the center of the semi-circular series of graduations 18 may be conceived of as coinciding with the represented earth's center; which is also the center of the circular series of graduations 2, which center is designated by the reference numeral 11.

For structural reasons it is not convenient to mount the member on which the semi-circular series of graduations 18 is inscribed, on the "equatorial plane", i. e., on the line O—O'. Therefore the member on which the semi-circular series of graduations is inscribed is mounted away from the center of the circular series of graduations 2. The arms 3 and 4 have substance and depth; consequently the circular series of graduations 2 is dropped a convenient distance below the plane in which the center or axis of the semi-circular series of graduations 18 lies; and so that the axis of the circular series of graduations 2 still intersects the axis of the semi-circular series of graduations 18, and at right angles to it.

Also note that when the indicating arm 19 is moved on the semi-circular series of graduations 18, and the shaft 15 is rotating on its axis, which is the axis of the semi-circular series of graduations 18, and is rotating with it the arm 4, the rotating of the arm 4 about the axis of the shaft 15 is equivalent to rotating the semi-circular series of graduations "Z" about the polar axis P—P'. And since the semi-circular series of graduations Y and Z represent two meridians; the former of the observer, the latter of the object; the moving of the indicating arm 19 on the semi-circular series of graduations 18, causes the plane of the object's meridian to swing toward or from the observer's meridian, since the arm 4 virtually lies in the plane of the meridian of the object.

Also note that the center of the ball "A" actually lies in the plane of the axis of shaft 15; and that ball B lies in the same plane, and rotates with it about the axis of shaft 15; which, as pointed out above, is equivalent to rotating about the polar axis P—P'. The line radiating from the virtual center of the circular series of graduations 2 to the center of ball A lies in the same plane as the axis of the semi-circular series of graduations 18; and the line radiating from the virtual center of the circular series of graduations 2 to the center of ball B lies in the same plane when the arm 4 is set to indicate an angle on semi-circular series of graduations Z.

It is therefore proper when operating the instrument to conceive of the circular series of graduations 2 as representing two meridians; the arms 3 and 4 terminating in balls A and B respectively, as lying on the planes of the represented meridians; the pivots of the arms 3 and 4 as lying at the represented earth's center; and the semi-circular series of graduations 18 as lying in the equatorial plane or in a plane parallel thereto, and with its center at the represented earth's center, or at some point on the polar axis.

It will thus be seen that I have provided a compact and efficient instrument by means of which latitude, declination, altitude or hour-angle may be readily determined from a knowledge of any three of such factors, or by which latitude, declination, altitude or azimuth may be readily determined from a knowledge of any three of such factors. While I have illustrated and described herein a preferred embodiment of my invention, it is to be understood that various changes may be made in the size, shape and construction of parts, without departing from the spirit of my invention or the scope of the subjoined claims.

Having thus described my invention, I claim:

1. A navigating instrument comprising a base plate provided with a circular series of graduations, a first arm pivotally mounted at the center of said circular series of graduations and adapted to move over said graduations, a shaft mounted on said base plate for rotation on an axis perpendicular to an axis passing through the center of the circular series of graduations, a second arm pivotally connected to said shaft on an axis coinciding with the axis passing through the center of the circular series of graduations, said arm adapted to move over said graduations and to rotate with said shaft, a member provided with a semi-circular series of graduations disposed with the center of said series of graduations coinciding with the axis of said shaft, a third arm connected to said shaft and adapted to move over said semi-circular series of graduations, movement of said second or third arm causing rotation of said shaft and a corresponding movement of the other arm connected to the shaft, and means for determining the angle included between said first and second arms.

2. A navigating instrument comprising a base plate provided with a circular series of graduations, a first arm pivotally mounted at the center of said circular series of graduations and adapted to move over said graduations, a shaft mounted on said base plate for rotation on an axis perpendicular to an axis passing through the center of the circular series of graduations, a second arm pivotally connected to said shaft on an axis coinciding with the axis passing through the center of the circular series of graduations, said arm adapted to move over said graduations and to rotate with said shaft, a member provided with a semi-circular series of graduations and mounted on said base plate with the semi-circular series of graduations disposed in a plane extending substantially at right angles to the axis of said shaft and with the center of said series of graduations coinciding with the axis of the shaft, a third arm connected to said shaft and extending therefrom substantially at right angles to the axis of said shaft, said third arm adapted to move over said semi-circular series of graduations, movement of said second or third arm causing rotation of said shaft and a corresponding movement of the other arm connected to the shaft, and means for determining the angle included between said first and second arms.

3. A navigating instrument comprising a base plate provided with a circular series of graduations, a first arm pivotally mounted at the center of said circular series of graduations and adapted to move over said graduations, a shaft mounted on said base plate for rotation on an axis perpendicular to an axis passing through the center of the circular series of graduations, a second arm pivotally connected to said shaft on an axis coinciding with the axis passing through the center of the circular series of graduations, said arm adapted to move over said graduations and to rotate with said shaft, a semi-circular member provided with a semi-circular series of graduations, said semi-circular member being disposed in a plane extending substantially at right angles to the plane of the circular series of graduations and with its center and the center of the semi-circular series of graduations coinciding with the axis of said shaft when said semi-circular member is in its normal operative position, a third arm connected to said shaft and extending therefrom substantially at right angles to the axis of said shaft and adapted to move over said semi-circular series of graduations to cause rotation of said shaft, movement of said second or third arm causing a corresponding movement of the other arm connected to the shaft, means for clamping said third arm in an adjusted position on said semi-circular member, said semi-circular member having a notch through which said clamping means may pass to permit the semi-circular member to be moved to an inoperative position substantially parallel to the plane of the circular series of graduations, and means for determining the angle included between said first and second arms.

4. A navigating instrument comprising a base plate provided with a circular series of graduations, a first arm pivotally mounted at the center of said circular series of graduations and adapted to move over said graduations, a shaft mounted on said base plate for rotation on an axis perpendicular to an axis passing through the center of the circular series of graduations, a second arm pivotally connected to said shaft on an axis coinciding with the axis passing through the center of the circular series of graduations, said arm adapted to move over said graduations and to rotate with said shaft, an arcuate member having its center on the axis passing through the center of said circular series of graduations, said arcuate member being connected to said shaft for rotation with said shaft, means for clamping said second arm to said arcuate member, means to rotate said shaft to cause the second arm and the arcuate member to swing above said circular series of graduations, and means for determining the angle included between said first and second arms.

5. A navigtating instrument of the type defined in claim 1, in which the means for determining the angle included between said first and second arms consists of projections on each of said arms, and a pair of calipers having two pivoted legs, each of said legs having a socket adapted to receive the projection on one of said arms, and said calipers including a series of graduations for determining the angle included between said first and second arms.

5. A navigating instrument of the type defined in claim 1, in which the means for determining the angle included between said first and second arms consists of a sphere mounted on each of the said arms at a position equidistant from the center of the circular series of graduations, and a pair of calipers having two pivoted legs, each of said legs having a semi-spherical socket adapted to fit over the sphere on one of said arms, said sockets being spaced from the pivotal axis of said caliper legs a distance corresponding to the distance between the center of the circular series of graduations and each of the spheres on the first and second arms, and a graduated quadrant carried by one of said caliper legs and crossed by the other of said legs to determine the angle included between said first and second arms.

EDWARD J. WILLIS.